United States Patent [19]

Spretnjak et al.

[11] 4,407,093
[45] Oct. 4, 1983

[54] VENTILATING WINDOW

[75] Inventors: Steve A. Spretnjak, Elkhart, Ind.; Colin Anthony, Aurora, Canada

[73] Assignee: Excel Industries, Elkhart, Ind.

[21] Appl. No.: 428,422

[22] Filed: Sep. 29, 1982

[51] Int. Cl.³ .............................................. B60J 1/14
[52] U.S. Cl. ..................................... 49/391; 411/119; 411/153; 411/542
[58] Field of Search ................ 49/391, 390, 392, 393, 49/388, 389; 411/542, 119, 153

[56] References Cited

U.S. PATENT DOCUMENTS 3,052,497  9/1962  Lohr ....................................... 49/391
3,384,997  5/1968  Heeter .................................... 49/391

FOREIGN PATENT DOCUMENTS 626354  7/1949  United Kingdom .................. 49/391

Primary Examiner—Philip C. Kannan
Attorney, Agent, or Firm—James D. Hall

[57] ABSTRACT

An improved vehicle ventilating window assembly which includes a non-circular pivot rod fitted within a circular opening in the window frame. A washer having spaced projections thereon is provided to fill the spaces created within the opening when the rod is inserted, thereby allowing a snug fit of the window within the frame with little or no transverse movement of the window with respect to the frame.

2 Claims, 4 Drawing Figures

U.S. Patent    Oct. 4, 1983    4,407,093
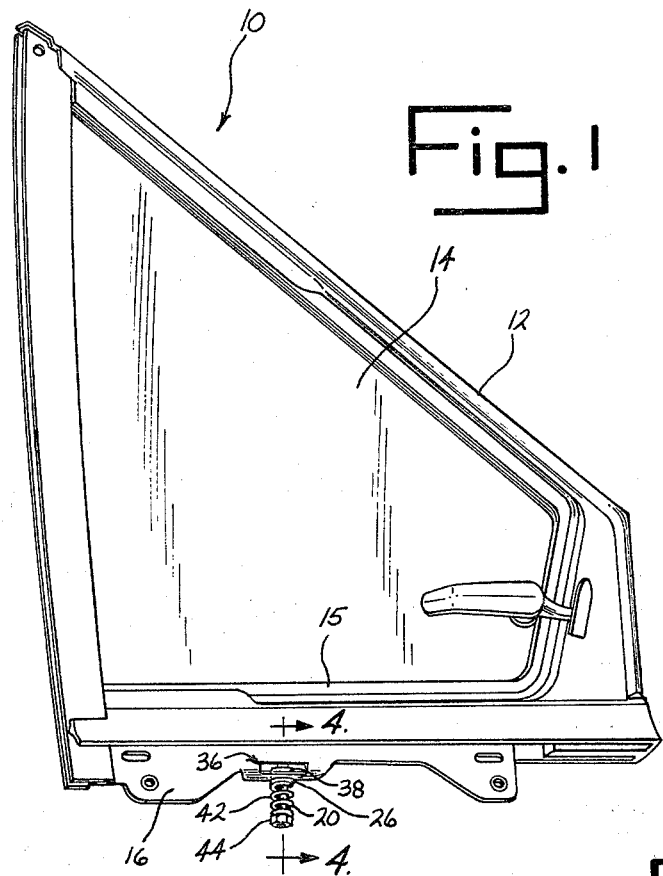
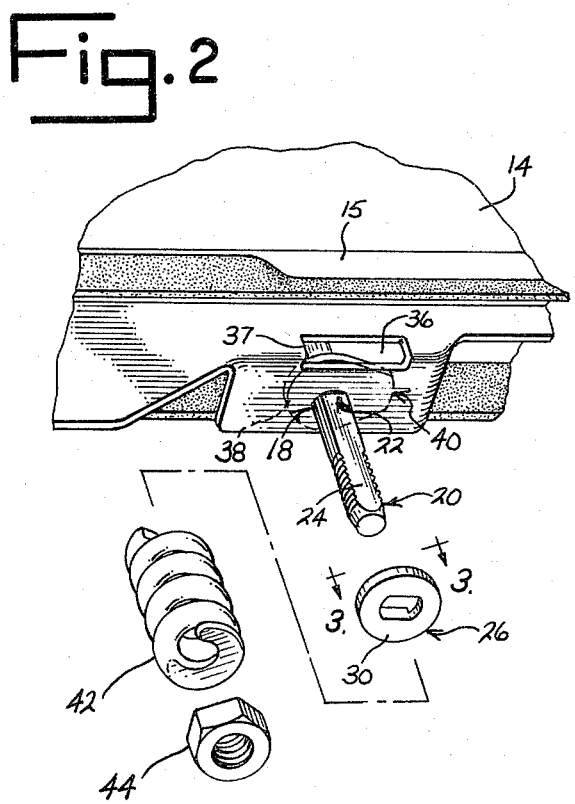
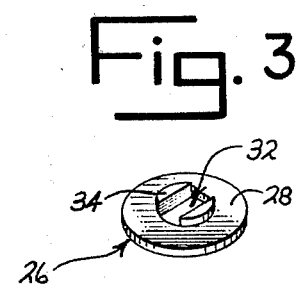
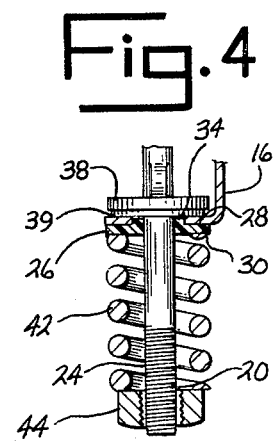

VENTILATING WINDOW

SUMMARY OF THE INVENTION

This invention relates to an improvement in a vehicle ventilating window assembly.

One of the characteristics of a vehicle ventilating window is its ability to be rotated about a vertical axis. Heretofore, ventilating window assemblies were equipped with a circular pivot rod which was fitted through a circular opening formed in a lower member of the window frame. The rod was attached at one end to the lower edge of the ventilating window trim, the other edge being secured to the vehicle frame. Each rod was specially manufactured to the proper dimensions, which assured a snug fit of the window within the frame and a corresponding restriction of transverse movement of the window relative to the frame.

This invention eliminates the need for special forming of each pivot rod, thereby reducing the cost of producing a ventilating window assembly. The invention calls for the addition of a washer which is fittable about a forged non-circular rod which fits loosely into the frame circular opening. The washer includes projections which conform to the gaps created by the loose fit of the rod within the opening. Constructed in this manner, the rod fits snugly within the opening and may be freely rotated within the opening with minimal or little lateral movement.

Accordingly, it is an object of this invention to provide for an improved vehicle ventilating window assembly.

Another object of this invention is to provide for a vehicle ventilating window assembly which is resistant to lateral movement of the window relative to the frame.

Another object of this invention is to provide for a vehicle ventilating window assembly which is efficient and economical.

Other objects of this invention will become apparent upon a reading of the following description.

BRIEF DESCRIPTION OF THE DRAWINGS

A preferred embodiment of the invention has been chosen for illustration wherein:

FIG. 1 is a perspective view of a vehicle ventilating window assembly.

FIG. 2 is a fragmentary perspective bottom view of the window with portions disassembled for purposes of illustration.

FIG. 3 is a perspective view of the washer used in this invention as seen from line 3—3 of FIG. 2.

FIG. 4 is an enlarged sectional view taken along line 4—4 of FIG. 1.

DESCRIPTION OF THE PREFERRED EMBODIMENT

The preferred embodiment illustrated is not intended to be exhaustive or to limit the invention to the precise form disclosed. It is chosen to best explain the principles of the invention so that others skilled in the art may best utilize the invention.

Ventilating window assembly 10 includes a rigid frame 12 which is adapted for connection to a vehicle body. A glass panel 14 is located within frame 12. Frame 12 includes a generally lower horizontal member 16 which has a circular opening 18 extending therethrough to glass panel 14. A pivot rod 20 having opposite rounded sectors separated by flat sides 24 extends through frame opening 18 and is attached to the glass panel at its trim part 15. Turning of rod 20 causes opening and closing movement of glass panel 14 within frame 12.

Because of the flattened side shape of pivot rod 20, opposite spaces 22 exist between pivot rod sides 24 and the periphery of frame opening 18 with the rod at its rounded sectors fitting complementally within opening 18. A washer 26, having an upper surface 28, a lower surface 30 and a central opening 32 is fitted about pivot rod 20. Spaced projections, such as semicircular tabs 34, are located upon washer upper surface 28 at opposing sides of the washer opening 32. Washer tabs 34 fit complementally into opposite spaces 22 between pivot rod sides 24 and frame opening 18 when washer 26 is fitted about rod 20 next to the frame opening. Washer 26 will rotate with rod 20 in frame member 16. Washer tabs 34 serve to restrict lateral movement of rod 20 within frame opening 18 with a corresponding reduction of transverse movement of glass panel 14 relative to frame 12.

A horizontal slot 36 is formed in frame member 16. A stop washer 38 is secured about pivot rod 20 at slot 36 above a spacer-bearing washer 39. When glass panel 14 is rotated with pivot rod 20 within frame 12 into its full open position, protruding edge 40 of stop washer 38 contacts a side edge 37 of frame slot 36, thereby restricting rotational movement of the glass panel. A helical spring 42 is fitted about pivot rod 20 and a nut 44 is threaded upon rod 20 to compress the spring against frame member 16, securing the window assembly components in position.

It is to be understood that the above description does not limit the invention to the precise form disclosed and that it may be modified within the scope of the appended claims.

We claim:

1. A ventilating window assembly for mounting in a window opening within a vehicular housing, said assembly including a rigid frame having a lower horizontal member, a glass panel located within said frame, said lower frame member having a generally circular opening therethrough, a pivot rod having opposite flat sides and connected at one end to said glass panel, said rod extending through said lower frame member opening and defining in conjunction with the periphery of the lower frame member opening opposite spaces between said rod sides and opening periphery, said glass panel being rotatable between a closed position and an open position with respect to said frame, the improvement comprising a washer including upper and lower surfaces and having a central opening, spaced projections located upon one said washer surface at opposite sides of said central opening therein, said washer fitted upon said rod with the rod extending through said washer central opening and said projections fitting into said spaces between the rod sides and said lower frame member opening periphery, said washer being rotational with said rod within said lower frame member opening and constituting means for restricting lateral movement of said rod within the lower frame member opening.

2. The assembly of claim 1 wherein said projections are semi-circular tabs located on opposite sides of said washer central opening, said tabs fitting complementally within said spaces between the rod sides and lower frame member opening periphery.

* * * * *